United States Patent
Birmingham

(10) Patent No.: US 6,689,219 B2
(45) Date of Patent: Feb. 10, 2004

(54) APPARATUS AND METHOD FOR DISPENSING VISCOUS LIQUID MATERIAL

(76) Inventor: Michael Antoine Birmingham, 12B Sylvan Trail, Ballston Lake, NY (US) 12019

(*) Notice: Subject to any disclaimer, the term of this patent is extended or adjusted under 35 U.S.C. 154(b) by 0 days.

(21) Appl. No.: 09/809,375

(22) Filed: Mar. 15, 2001

(65) Prior Publication Data

US 2002/0132038 A1 Sep. 19, 2002

(51) Int. Cl.⁷ .............................................. B05C 11/10
(52) U.S. Cl. ...................... 118/669; 118/679; 118/713
(58) Field of Search ............................ 118/668, 712, 118/713, 695, 696, 669, 670, 676, 679, 680, 686

(56) References Cited

U.S. PATENT DOCUMENTS

| 3,598,160 A | 8/1971 | Quinn et al. | |
| 4,419,168 A | 12/1983 | Paul | |
| 4,662,540 A | 5/1987 | Schroter | |
| 4,668,479 A | * 5/1987 | Manabe et al. | 422/186.05 |
| 4,819,953 A | 4/1989 | Joh | |
| 4,838,696 A | * 6/1989 | Pryor | 356/602 |
| 4,930,792 A | 6/1990 | Gluck et al. | |
| 5,052,338 A | 10/1991 | Maiorca et al. | |
| 5,175,018 A | * 12/1992 | Lee et al. | 427/8 |
| 5,711,989 A | 1/1998 | Ciardella et al. | |
| 5,814,375 A | * 9/1998 | Hissen | 427/421 |
| 5,932,012 A | * 8/1999 | Ishida et al. | 118/669 |
| 5,935,654 A | 8/1999 | Katai et al. | |
| 5,963,289 A | 10/1999 | Stefanov et al. | |
| 5,964,465 A | 10/1999 | Mills et al. | |
| 6,096,132 A | * 8/2000 | Kaiba et al. | 118/680 |
| 6,103,427 A | 8/2000 | Storm | |

\* cited by examiner

Primary Examiner—Richard Crispino
Assistant Examiner—George R. Koch, III

(57) ABSTRACT

An automated dispensing system and method for dispensing a viscous liquid material along an imperfect dispensing path. In a first scan, a scanning apparatus determines a dispensing path. A dispensing apparatus dispenses the viscous liquid material along the dispensing path. In a second scan, the scanning apparatus measures a dimension of the dispensed material. Object not meeting an acceptable liquid height are rejected.

15 Claims, 8 Drawing Sheets

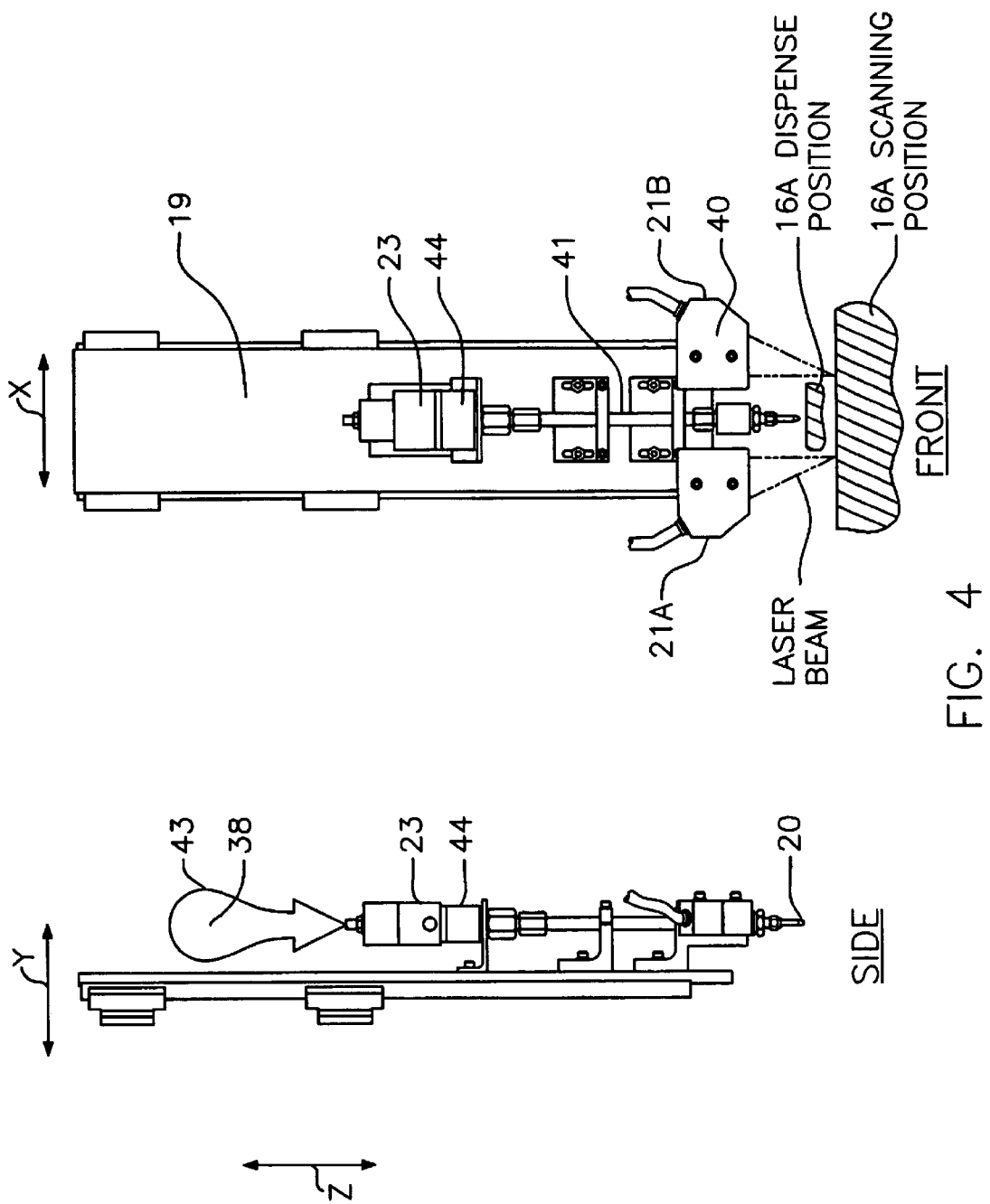

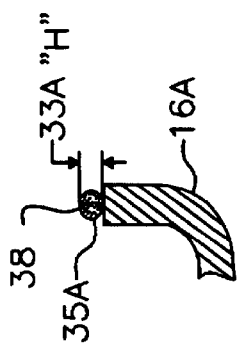
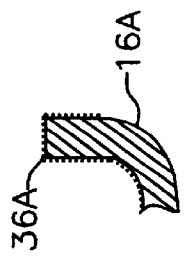
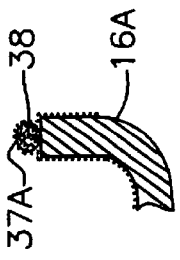
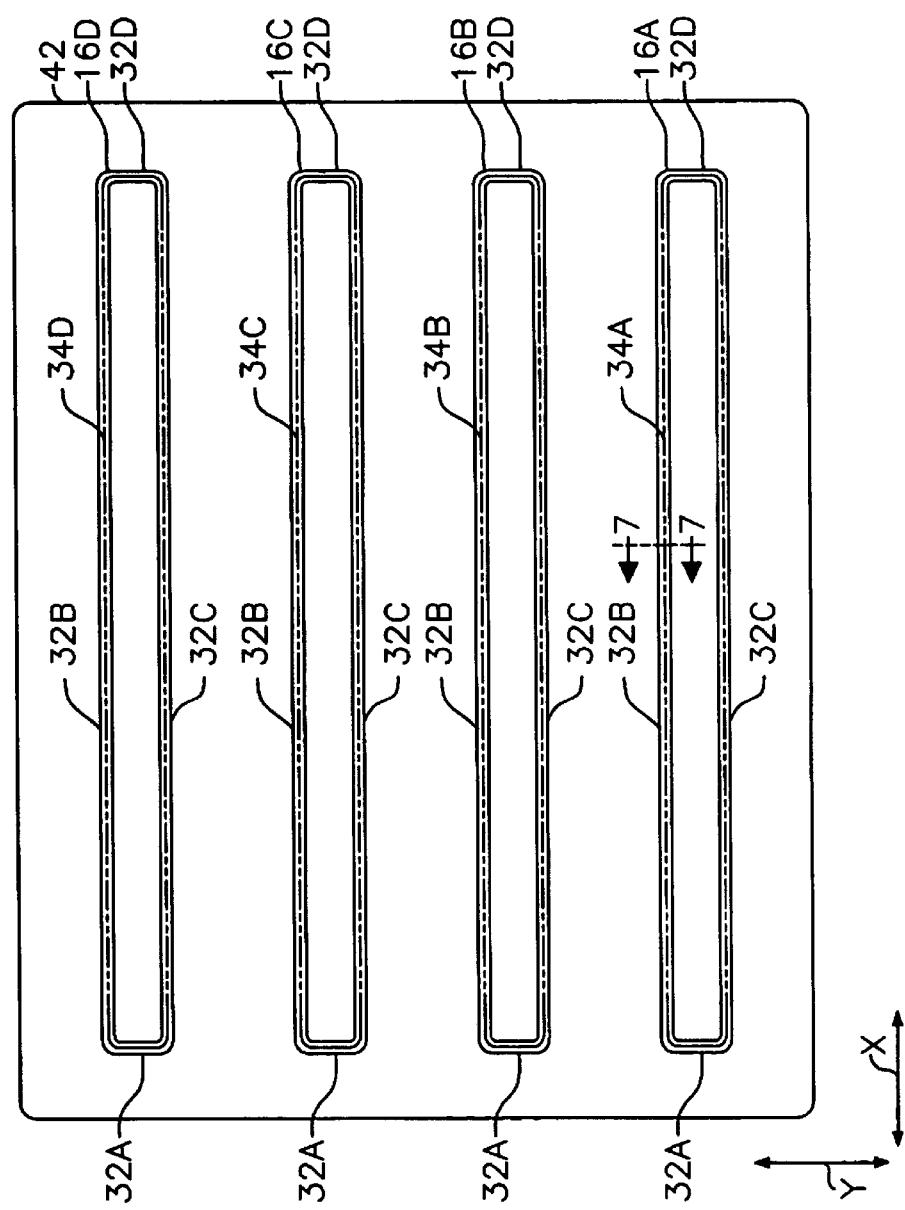
FIG. 6

FIG. 8

APPARATUS AND METHOD FOR DISPENSING VISCOUS LIQUID MATERIAL

FIELD OF THE INVENTION

The present invention relates generally to an apparatus and method for dispensing a viscous liquid material onto a surface. More particularly, the present invention relates to providing a liquid gasket material onto a twisted, warped or displaced surface.

BACKGROUND OF INVENTION

Automatic liquid dispensing machines are used for dispensing materials, (e.g., mastics, sealants, gaskets, adhesives, etc.) onto a surface of an object. Problems arise when trying to automatically dispense material onto a non-repeatable surface of an object, in other words, a surface that is twisted, warped or displaced. Currently available robotic devices may not be able to follow variations created by the twisting, warping or displacement.

SUMMARY OF THE INVENTION

The present invention provides an automated dispensing system for dispensing a liquid onto a non-repeatable surface of an object. The object may include any suitable object (e.g., cap, cover, radiator end tank cover, etc.), that requires a liquid material (e.g., mastic, sealant, gasket, adhesives, etc.) to be applied along an irregular dispensing path. In a first scan, a scanning apparatus of a robotic apparatus maps and determines a first contour profile, then determines the dispensing path. A dispensing apparatus of the robotic apparatus then dispenses the viscous liquid material along the dispensing path. In a second scan, the scanning system of the robotic apparatus measures and maps a height of the dispensed material. Objects not meeting an acceptable dispensed material height are rejected.

BRIEF DESCRIPTION OF THE DRAWINGS

The features of the present invention will best be understood from a detailed description of the invention selected for the purposes of illustration and shown in the accompanying drawings in which:

FIG. 4 illustrates a front and side view of the dispensing apparatus and the scanning apparatus;

FIG. 6 illustrates a plan view of a dispensing path along a top rail of each object;

FIG. 7 illustrates a cross-sectional view of a bead of material dispensed on the object; and FIG. 8 illustrates a front view of a display device of a robotic controller.

DESCRIPTION OF THE INVENTION

Figure 1:
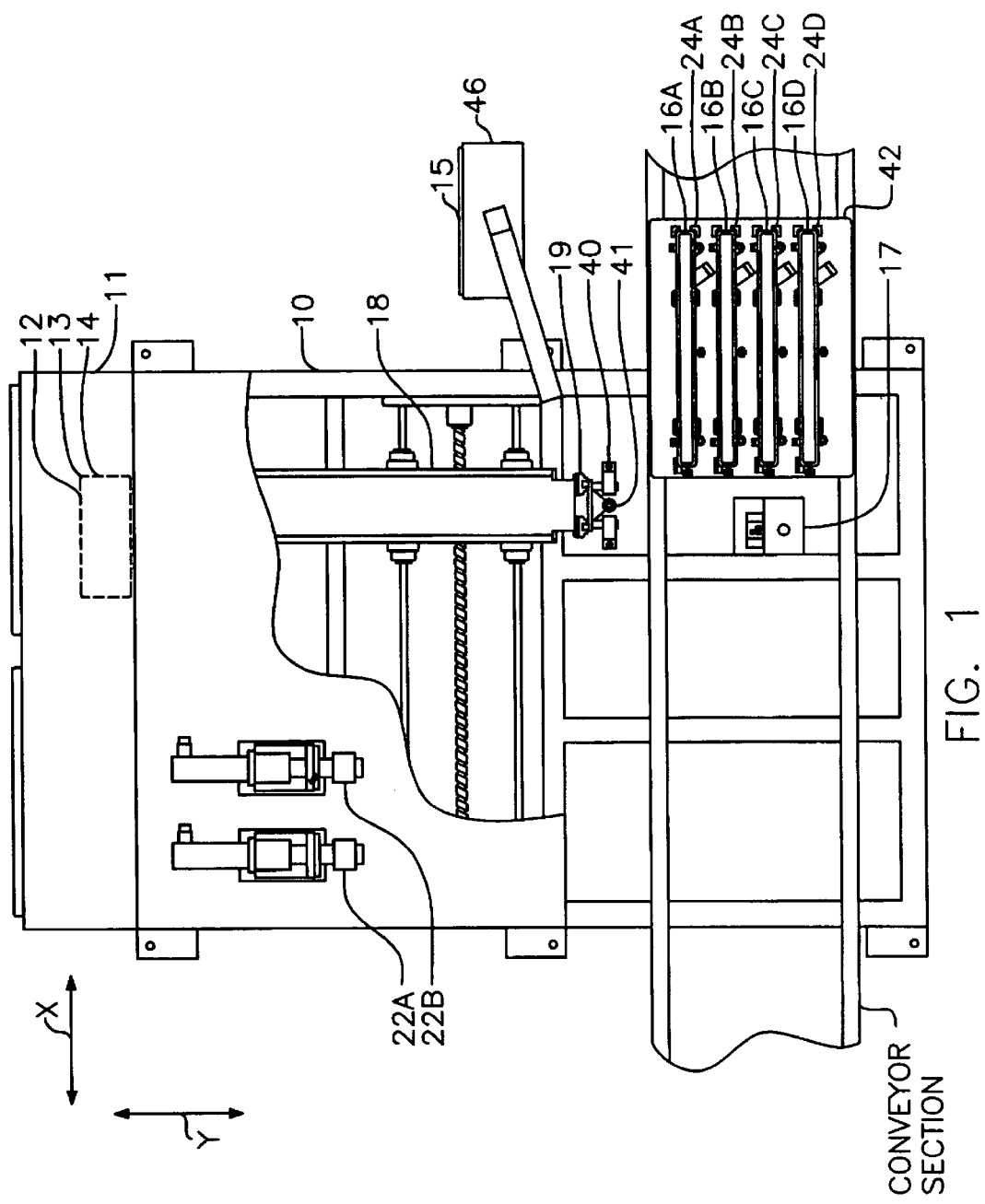
FIG. 1 illustrates a plan view of a robotic motion apparatus.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc. The features of the present invention are illustrated in detail in the accompanying drawings, wherein like reference numerals refer to like elements throughout the drawings. Although the drawings are intended to illustrate the present invention, the drawings are not necessarily drawn to scale.

FIG. 1 illustrates a plan view of a robotic motion apparatus 10, a scanning apparatus 40, a data acquisition system 12, a computer processing system 13, a dispensing apparatus 41, and a robotic controller 14. The electronics being enclosed in an electrical enclosure 11.

Figure 2:
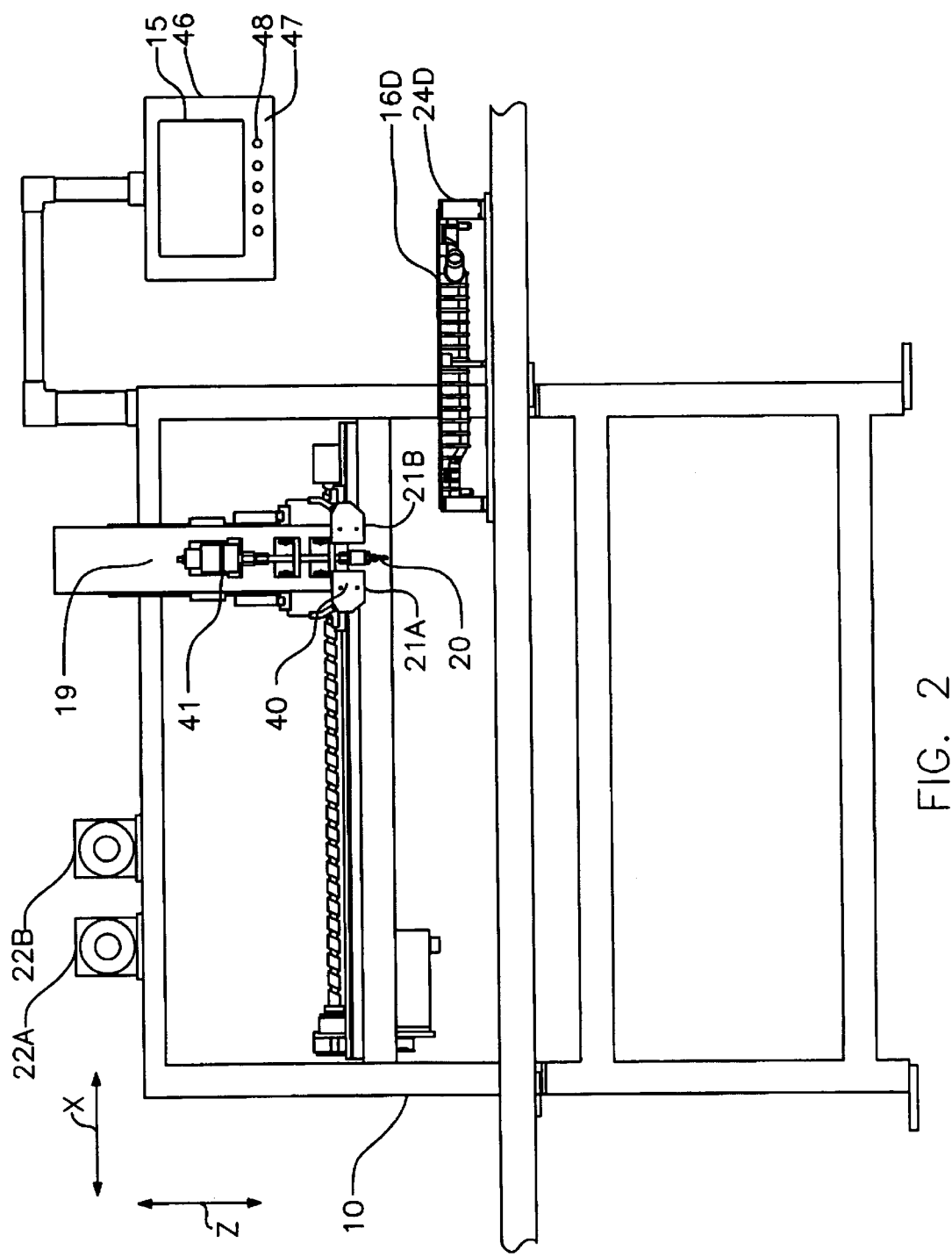
FIG. 2 illustrates a front view of a robotic motion apparatus.
Figure 3:
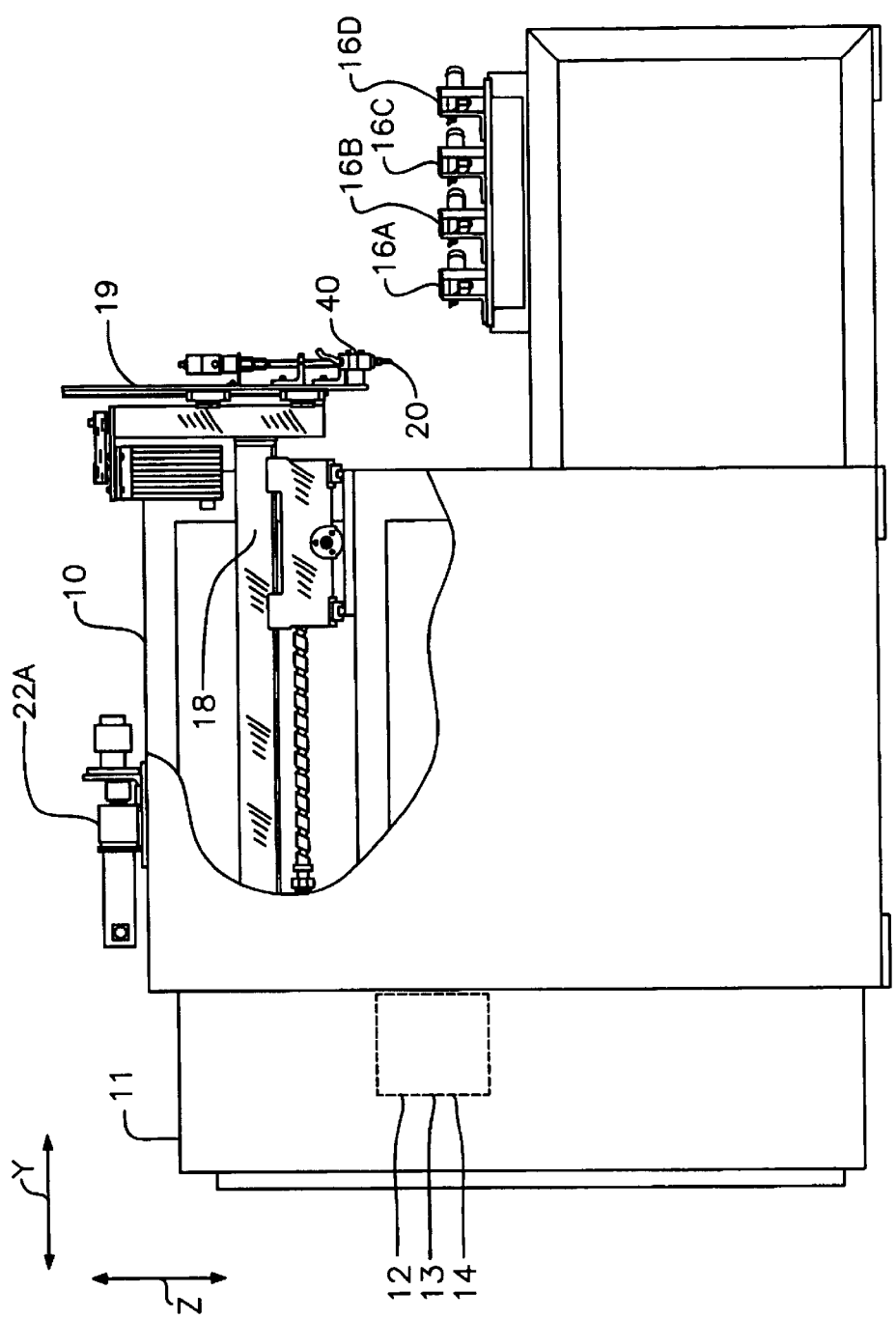
FIG. 3 illustrates a side view of the robotic motion apparatus.
Figures 5, 5A:
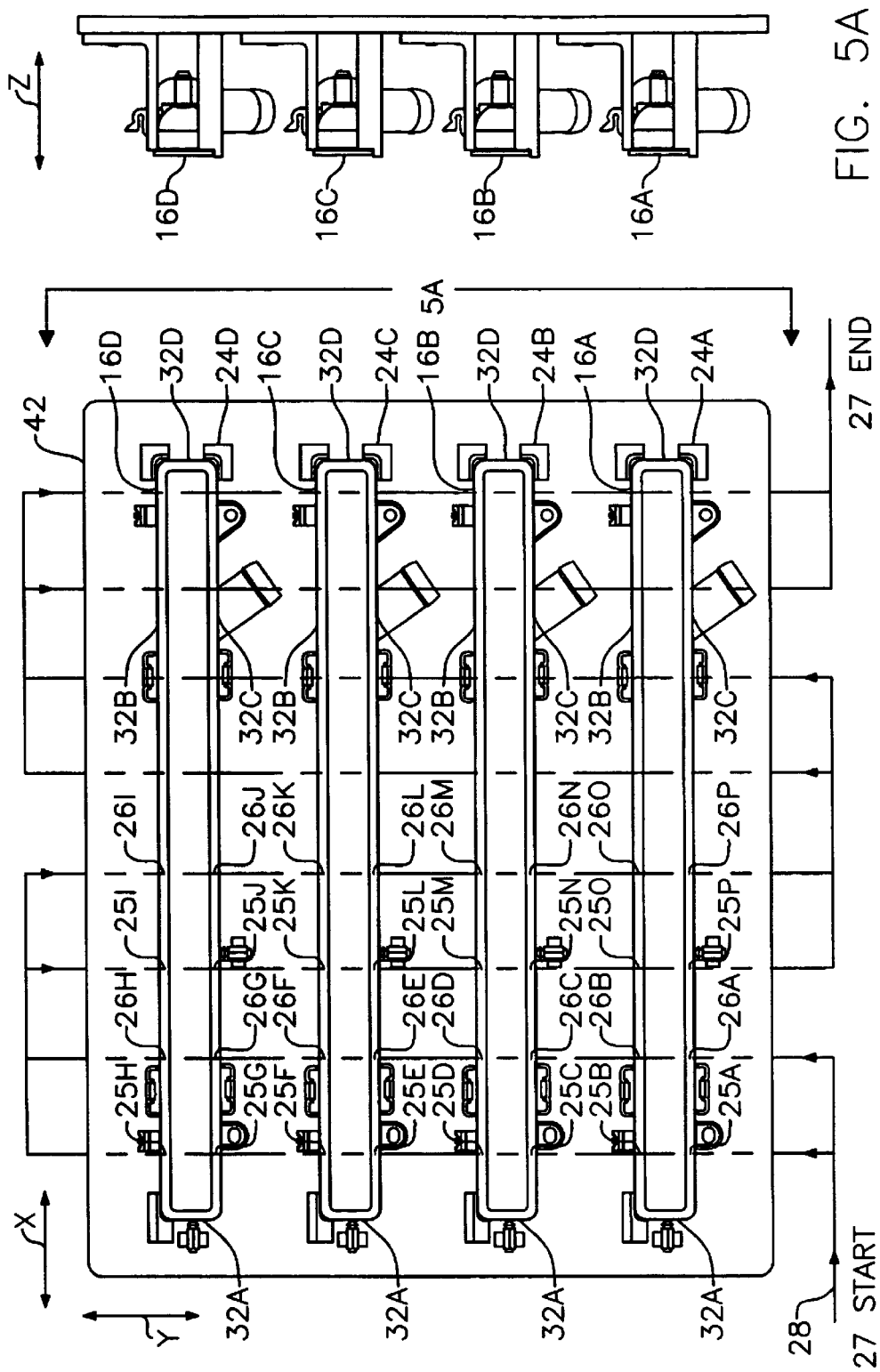
FIG. 5 illustrates a scanning path of the scanning apparatus for determining a contour profile of each object.

FIG. 2 illustrates a front view of the robotic motion apparatus 10. FIG. 3 illustrates a an side view of the robotic motion apparatus 10, and FIG. 4 illustrates a front and side view of the scanning and dispensing apparatus 40 and 41. FIGS. 5, and 6 illustrate plan views of a pallet 42. A plurality of objects 16A, 16B, 16C, and 16D are removably attached to the pallet 42 by clamping assemblies 24A, 24B, 24C, and 24D (FIG. 5). The clamping assemblies 24A, 24B, 24C, and 24D may be any suitable means (e.g., clamps, supports, removable fasteners, etc.) for removably attaching the objects 16A, 16B, 16C, and 16D to the pallet 42. The clamping assemblies 24A–24D rigidly locate and secure the objects 16A–16D to the pallet 42.

FIG. 4 illustrates a side and front view of the dispensing apparatus 41 and the scanning apparatus 40. As illustrated in FIG. 4, the dispensing apparatus 41 includes a material supply reservoir 43, material supply pumps 22A and 22B, a material control valve 44, a solenoid 23, and a nozzle 20. The material supply reservoir 43 stores and supplies a material 38. the material 38 may be any suitable material (e.g., mastic, sealant, liquid gasket, liquid silicon rubber, two-part liquid silicon rubber, etc.). The material supply reservoir 43 may supply the material 38 under pressure to the nozzle 20. The material control valve 44 turns on or shuts off the flow of the material 38 to the nozzle 20. The material 38 passes through the nozzle 20 and is dispensed onto a surface of the object 16A.

As illustrated in FIG. 2, the scanning apparatus 40 may include a displacement sensor 21A and a displacement sensor 21B. The displacement sensors 21A, 21B may be any suitable sensor (e.g., laser displacement sensor, light sensor, visual sensor, proximity sensor, etc.). The displacement sensors 21A, 21B are moved above and across the objects 16A–16D by the robotic motion apparatus 10A. The displacement sensors 21A, 21B repeatedly take measurements of the objects 16A–16D. From these measurements, a first contour profile 36A–36D of the objects 16A–16D may be established (FIG. 4).

FIG. 1 illustrates a calibration apparatus 17. The calibration apparatus 17 is used to determine the X, Y, and Z offset 45 between the displacement sensors 21A, 21B of the scanning apparatus 40 and the nozzle 20 of the dispensing apparatus 41. The nozzle 20 of the dispensing apparatus 41 is placed within the calibration apparatus 17 and the X, Y, and Z offset 45 is determined.

As illustrated in FIG. 1, the scanning apparatus 40 and the dispensing apparatus 41 are attached to the robotic motion apparatus 10. The robotic motion apparatus 10 includes an X-Y motion assembly 18, and a Z motion assembly 19. The X-Y motion assembly 18 provides motion in an X-Y direction and the Z motion assembly 19 provides motion in a Z direction. Therefore, the robotic motion apparatus 10 may move the scanning apparatus 40 and the dispensing apparatus 41 in any desired X, Y or Z direction. Optionally, other robotic motion apparatus may be used, such as, an arm robot, an n-axis motion machine (wherein n=2,3,4 . . . ),etc.

The data acquisition system 12 (FIG. 1) acquires and stores measurement information provided by the scanning apparatus 40. A computer processing system 13 reads the measurement information from the data acquisition system 12 and location "Z" and "X" information provided from the robotic motion controller 14. The computer processing system 13 then determines the first contour profiles 36A–36D of the objects 16A–16D. The computer processing system 13 determines a dispense path 34A–34D for objects 16A–16D from the first contour profiles 36A–36D. The computer processing system communicates the dispense path 34A–34D information to the robotic motion controller 14. The robotic motion controller 14 controls the robotic motion apparatus 10, the scanning apparatus 40, and the dispensing apparatus 41. The computer processing system 13 may include a display device 15 and an input device 46 (FIG. 2). The display device 15 may include any suitable device (e.g., digital display, screen display, etc.), as illustrated in FIG. 2. The input device 46 allows an operator to input commands into the computer processing system 13. The input device 46 may include any suitable device (e.g., keyboard, touch screen, computer mouse, etc.). The robotic motion apparatus 10 may include an emergency stop control system 47 (FIG. 2). The emergency stop control system 47 may include a "stop" button 48. If an operator presses the "stop" button 48, the emergency stop control system 47 stops the robotic motion apparatus 10.

Figure 8:
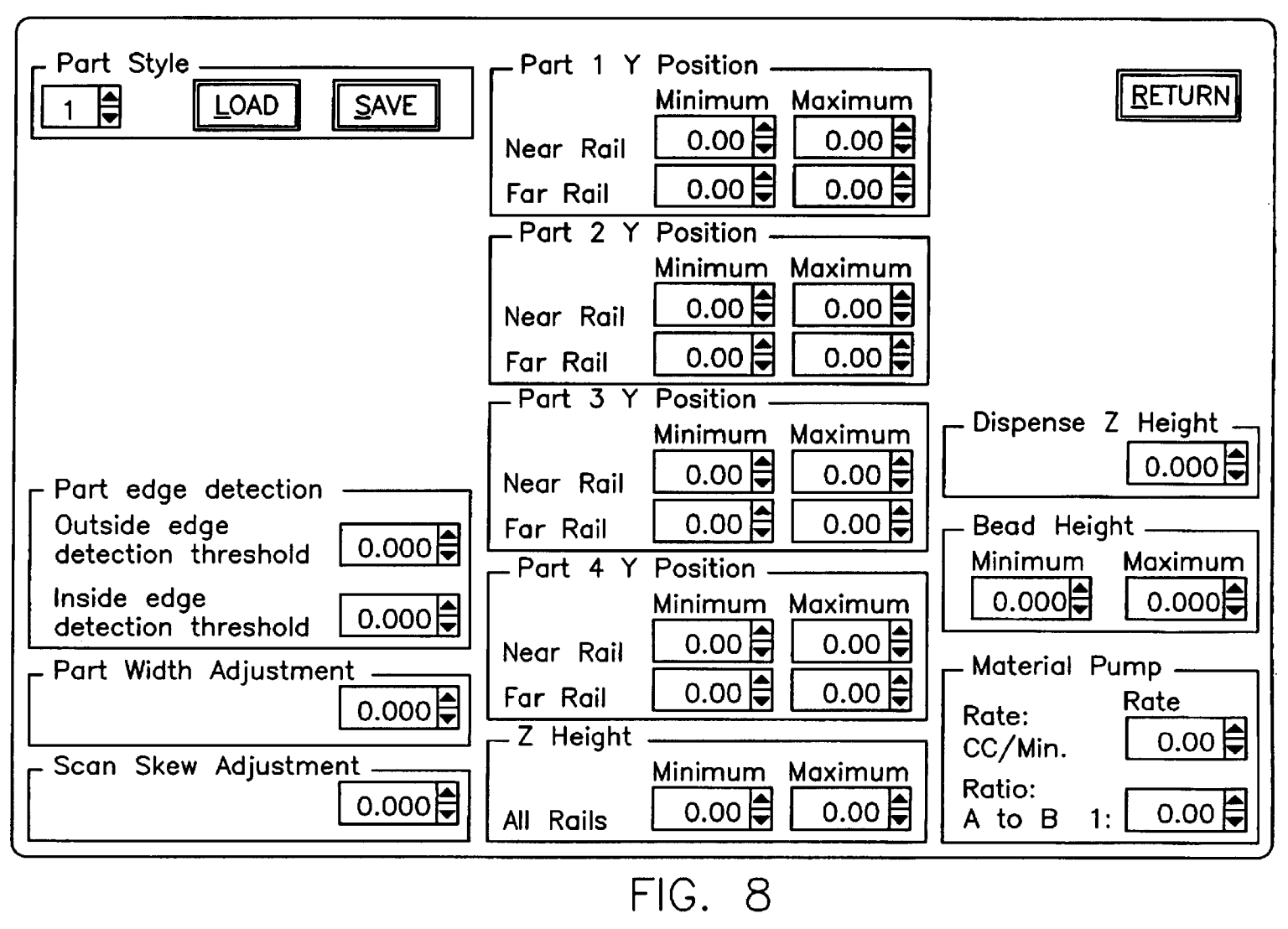
Figure 9:
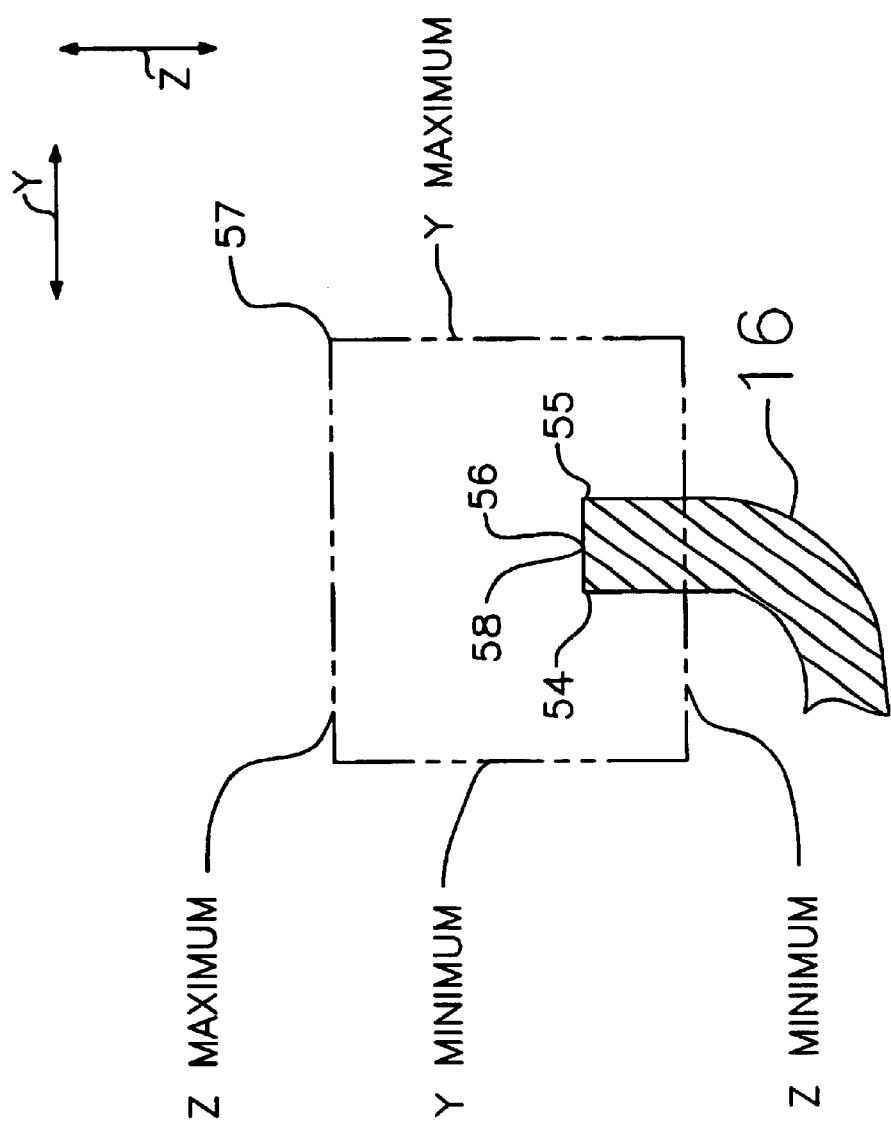
FIG. 9 illustrates a cross section view of a scanning window around the object rails.

In robotic motion apparatus 10, the objects such as 16A, 16B, 16C, and 16D are attached to a pallet 42 as illustrated in FIG. 5. The pallet 42 is brought to a location under the robotic motion apparatus 10 (FIG. 1). The robotic motion apparatus 10 moves the scanning apparatus 40 above the objects 16A–16D to map the objects 16A–16D in a first scan. A first scanning path is illustrated in FIG. 5. The first scanning path 27 starts at 27 "Start" and ends at 27 "End". The displacement sensors 21A and 21B take measurements in the "Z" direction between the sensors 21A and 21B and the objects 16A–16D. The measurements are taken at 0.002 inch intervals as the robotic motion apparatus 10 moves the scanning apparatus 40 in the "Y" direction. Other intervals may be used depending on the accuracy required for any given application. The computer processing system 13 reads the measurements acquired from the data acquisition system 12. The data is searched within a detection window 57 (FIG. 9) for the highest point 58. The detection window 57 is stored in the computer processing system 13 by means of an input screen (FIG. 8). The computer processing system 13 then determines the edges 54 and 55 by comparing the highest point 58 and a point by which the height drops by more than a configured threshold (FIG. 8). Once the edges 54 and 55 are determined, the dispense point 56 is calculated. The computer processing system 13 compares the location information of the objects 16A–16D with information stored by means of an input screen (FIG. 8) within the computer processing system 13. If the computer processing system 13 determines that the "Y" or "Z" location for any given part 16A–16D is out of acceptable limits, the computer processing system does not proceed with a dispense path 34A–34D on the out of tolerance part 16A–16D. The object 16A–16D location information at points 25A–25P, 26A–26P is calculated by the computer processing system 13 to obtain a first contour profile 36A–36D. The objects 16A–16D may be radiator end tank covers, which include a side rail 32B, a side rail 32C, and end rail 32A, and an end rail 32D. The side rails 32B and 32C are typically twisted, warped or displaced in the "Y" direction and in the "Z" direction (see FIG. 5 for the directions). Additionally, the end rails 32A, 32D may be displaced in the "Z" direction. The number of times the scanning apparatus 40 is moved over the parts is configurable based on accuracy needs of the dispense path 34 and FIG. 5 is only representative in nature. The computer processing system calculates a dispense path 34A–34D for the objects 16A–16D based on the first contour profile 36A–36D, the "X" and "Z" information from the robotic motion controller 14, and the "XYZ" offsets 45. The computer processing system 13 communicates the dispense path 34A–34D information to the robotic motion controller 14. The robotic motion controller 14 moves the dispensing apparatus 41 over the objects 16A–16D along the dispense paths 34A–34D. The nozzle 20 of the dispensing apparatus 41 moves over the objects 16A–16D and material 38 is dispensed onto the objects 16A–16D. The cross-sectional view in FIG. 7 illustrates a bead 35 of material 38 applied to the radiator end tank cover 16A along the dispensing path 34A. The height 33A "H" of the bead 35A of dispensed material 38 above the object 16A is illustrated in FIG. 7.

After the material 38 is dispensed onto each radiator end tank cover 16A–16D, the robotic motion apparatus 10A moves the scanning apparatus 40 above the radiator end tank covers 16A–16D in a second scan of the radiator end tank covers 16A–16D. The second scanning path 28 repeats the first scanning path 27, starting at 27 "Start" and ending at 27 "End". In a manner similar to the first scan, the displacement sensors 21A and 21B take measurements in the "Z" direction between the sensors 21A and 21B and the radiator end tank covers 16A–16D. The data acquisition system 12 acquires and stores these measurements from the second scan and determines a second contour profile 37A–37D. The computer processing system 13 calculates each bead height 33A–33D by subtracting each first contour profile 36A–36D from each second contour profile 37A–37D. The computer processing system 13 compares the bead height 33A–33D of the material 38 with a range of standard acceptable bead heights. If the bead height 33A–33D for any radiator end tank cover 16A–16D lies outside of the range of standard acceptable bead heights, then the computer processing 13 notes it. In addition to determining bead height, other bead characteristics (e.g., width, location, etc.). may be determined.

I claim:

1. An apparatus comprising:
   a. a scanning apparatus for automatically mapping a contour profile of a non-repeatable surface of an object;
   b. said scanning apparatus comprised of at least one displacment sensor;
   c. said scanning apparatus comprised of a motion system wherein said displacement sensor traverses said non-repeatable surface of an object in a direction substatially perpendicular to said displacement sensor's direction of measurement;
   d. a data acquisition means for recording a series of said displacement sensor measurements wherein each successive displacement sensor measurement correlates to an interval of said motion system movement, whereby said contour profile is obtained;
   e. a computer processing system that analyzes said contour profile to determine a substrate configuration or location;

f. said computer processing system that further determines a dispensing path based on said substrate configuration or location; and g. a dispensing apparatus for dispensing a material onto the object along said dispensing path.

2. The apparatus of claim 1, further including a robotic motion apparatus.

3. The apparatus of claim 2, wherein the robotic motion apparatus is selected from the group consisting of: an arm robot and an n-axis motion machine, wherein n is an integer greater than 1.

4. The apparatus of claim 1, wherein the sensor is a laser displacement sensor.

5. The apparatus of claim 1, further including a calibration apparatus for determining an offset distance between each displacement sensor and a material dispensing nozzle of the dispensing apparatus.

6. The apparatus of claim 2, further including a robotic controller.

7. The apparatus of claim 6, wherein the robotic controller further includes a display apparatus for displaying a set of output data.

8. The apparatus of claim 7, wherein the display apparatus includes a touch sensitive screen allowing an operator to input a set of requests to the robotic controller.

9. The apparatus of claim 6, wherein the robotic controller includes a keyboard for an operator to input a set of requests to the robotic controller.

10. The apparatus of claim 6, wherein the robotic controller includes an emergency stop control for stopping the scanning apparatus and the dispensing apparatus.

11. The apparatus of claim 1, wherein the object dispensed on is a radiator end tank.

12. The apparatus of claim 11, wherein the material is dispensed as a bead along at least one rail of the radiator end tank.

13. The apparatus of claim 1, wherein the dispensed material is a viscous material.

14. The apparatus of claim 13, wherein the viscous material is a liquid silicone rubber.

15. An apparatus comprising:

a. a scanning apparatus for determining the configuration or location of an object;

b. said scanning apparatus comprised of one or more displacement sensors;

c. a motion means for moving said displacment sensor in relation to said object in a direction substantially perpendicular to said displacement sensor's direction of measurement;

d. a recording means to record a succession of said displacement sensor measurements, wherein the interval between each successive measurement correlates to an interval of said motion means;

e. an analysis means for analyzing said recording wherein said object's configuration or location is determined;

f. a computational means for creating a motion path based on said object's configuration or location;

g. a communication means for communicating said motion path derived from said computational means to a dispensing apparatus;

h. a dispensing apparatus that acts on said motion path and dispenses a material onto said object.

* * * * *

Adverse Decision in Interference

Patent No. 6,689,219, Michael Antoine Birmingham, APPARATUS AND METHOD FOR DISPENSING VISCOUS LIQUID MATERIAL, Interference No. 105,328, final judgment adverse to the patentees rendered, January 13, 2006, as to claims 1-15.

*(Official Gazette April 18, 2006)*